United States Patent
Kowal et al.

(10) Patent No.: US 11,394,479 B2
(45) Date of Patent: Jul. 19, 2022

(54) BROADCAST RECEIVER FOR INFOTAINMENT SYSTEM AND METHOD OF OPERATING SAID RECEIVER

(71) Applicant: APTIV TECHNOLOGIES LIMITED, St. Michael (BB)

(72) Inventors: Jan Kowal, Cracow (PL); Piotr Stopa, Cracow (PL)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 17/051,327

(22) PCT Filed: Jul. 29, 2019

(86) PCT No.: PCT/EP2019/070396
§ 371 (c)(1),
(2) Date: Oct. 28, 2020

(87) PCT Pub. No.: WO2020/021125
PCT Pub. Date: Jan. 30, 2020

(65) Prior Publication Data
US 2021/0119714 A1    Apr. 22, 2021

(30) Foreign Application Priority Data

Jul. 27, 2018 (EP) .................................. 18186007

(51) Int. Cl.
*H04H 40/18* (2008.01)
*G06F 16/901* (2019.01)
(Continued)

(52) U.S. Cl.
CPC ......... *H04H 40/18* (2013.01); *G06F 16/9024* (2019.01); *H04H 60/44* (2013.01); *H04H 60/73* (2013.01); *H04H 2201/13* (2013.01)

(58) Field of Classification Search
CPC ........ H04H 40/18; H04H 60/44; H04H 60/73; H04H 2201/13
See application file for complete search history.

(56) References Cited

U.S. PATENT DOCUMENTS

| | | | |
|---|---|---|---|
| 8,787,822 B2 * | 7/2014 | Iyer | H04B 1/0014 455/3.06 |
| 9,900,632 B1 | 2/2018 | Flores Guerra | |
| 2008/0268801 A1 | 10/2008 | Wright et al. | |

FOREIGN PATENT DOCUMENTS

| | | |
|---|---|---|
| CN | 1925335 A | 3/2007 |
| DE | 10 2012 210313 A1 | 12/2013 |

(Continued)

OTHER PUBLICATIONS

Bosch, Method for detecting, storing and/or displaying station name of currently set broadcast broadcast radio station, (Year: 2013).*

(Continued)

*Primary Examiner* — Keith Ferguson
(74) *Attorney, Agent, or Firm* — Carlson, Gaskey & Olds, P.C.

(57) ABSTRACT

A receiver (10) includes one or more tuners (12) and one or more controller-circuits (28). The one or more tuners (12) are operable to receive broadcast-signals (14) from transmitters. The broadcast-signals (14) include metadata (16) that includes the broadcast-station-name (18). The one or more controller-circuits (28) are in communication with the one or more tuners (12). The one or more controller-circuits (28) store the metadata (16) in a first-memory-location (32), detect metadata-sequences (38) based on the metadata (16) stored in the first-memory-location (32), count occurrences (40) of each metadata-sequence (38), determine whether the count of occurrences (40) of each metadata-sequence (38) is greater than a first-threshold (42), determine the broadcast-station-name or its sequences (18) and store the broadcast- (Continued)

station-name (18) in a second-memory-location (44). A method (100) of operating a receiver (10) is also provided.

13 Claims, 4 Drawing Sheets

(51) Int. Cl.
*H04H 60/44* (2008.01)
*H04H 60/73* (2008.01)

(56) References Cited

FOREIGN PATENT DOCUMENTS

| EP | 0 946 009 A2 | 9/1999 |
| EP | 2632065 A2 | 8/2013 |
| JP | S62236219 A | 10/1987 |
| JP | H057164 A | 1/1993 |
| JP | H0951251 A | 2/1997 |
| KR | 20160012328 A | 2/2016 |

OTHER PUBLICATIONS

Extended European Search Report for Application No. EP 18186007.3 dated Jan. 23, 2019.
CN Application No. 201980029145.5, Office Action and Search Report dated Dec. 28, 2021.

* cited by examiner

FIG. 5A (BEFORE REDUCTION)

FIG. 5B (AFTER REDUCTION)

FIG. 6A (BEFORE REDUCTION)

FIG. 6B (AFTER REDUCTION)

BROADCAST RECEIVER FOR INFOTAINMENT SYSTEM AND METHOD OF OPERATING SAID RECEIVER

TECHNICAL FIELD

The present invention relates generally to a broadcast receiver for an infotainment system that determines a broadcast-station-name.

BACKGROUND OF THE INVENTION

The present invention relates more particularly to infotainment systems using the communication protocol called Radio Data Systems (RDS) in radio broadcasting or any other radio broadcasting communication protocol.

RDS data feeds contain metadata that may include a broadcast station identification, and programming information that may be displayed on a user's reception device, such as a vehicle infotainment display.

However, broadcasters may not adhere to the RDS data feed guidelines, resulting in an incorrect display of a station name or other metadata of interest to the user.

The document DE 10 2012 210313 A1 describes a method for detecting, storing and/or displaying station name of currently set broadcast radio station. It involves determining the number of times cyclically records are transmitted and storing the record arising with the largest number of times.

SUMMARY OF THE INVENTION

The present invention proposes to solve the above mentioned problem by providing a receiver that includes one or more tuners. The one or more tuners are operable to receive broadcast-signals from transmitters. The broadcast-signals include metadata that includes the broadcast-station-name. The receiver also includes one or more controller-circuits in communication with the one or more tuners. The one or more controller-circuits are configured to store the metadata in a first-memory-location, to detect metadata-sequences based on the metadata stored in the first-memory-location, to count occurrences of each metadata-sequence, to determine whether the count of occurrences of each metadata-sequence is greater than a first-threshold, to determine the broadcast-station-name, and to store the broadcast-station-name in a second-memory-location.

According to other advantageous features of the present invention:
- the one or more tuners are configured to be tuned to a single-broadcast-frequency;
- the first-threshold (42) is defined as a determined value ($C_{RMIN}$) chosen to ignore the less frequently appearing records ($C_R < C_{RMIN}$),
- the first-threshold is in a range from 500 occurrences to 1500 occurrences;
- the one or more tuners are configured to scan available broadcast-frequencies;
- each metadata-sequence is defined in accordance with graph theory and includes one or more records, each record including at least the following metadata: a string, a counter of observations of the record, a timestamp of last observation, an average period of time between two strings being observed (time after particular string was changed to another one) and one or more links to other records observed after current record including at least a counter of observations of the link and a timestamp of the last observation;
- the one or more controller-circuits are further configured to detect metadata-sequences based on the stored records and using the one or more links between records;
- the one or more controller-circuits are further configured to detect two or more metadata-sequences containing a same set of records and to merge these two or more metadata-sequences into one metadata-sequence by computing each record of each metadata-sequence with the same set of records in the following configuration: keep the string, add values of the counters of observations of the record, take the most recent timestamp of last observation, average the periods of time between two strings being observed, add values of the counters of observations of the link, take the most recent timestamp of last observation;
- the one or more controller-circuits are further configured to detect any metadata-sequence containing a loop defined as a metadata-sequence where one record appears at least twice and to reduce metadata-sequences containing a loop by cutting all records in the loop after the first appearance of the record repeated twice;
- the one or more controller-circuits are further configured to reduce the metadata-sequences by keeping for further use only sequences for which the count of occurrences is greater than a first-threshold;
- the one or more controller-circuits are further configured to determine whether the count of occurrences of each metadata-sequence is greater than a second-threshold and further reduce the metadata-sequences by keeping for further use only sequences for which the count of occurrences is greater than a second-threshold, thereby the one or more controller-circuits are configured to determine the broadcast-station-name and stores the broadcast-station-name in the second-memory-location;
- the second-threshold is defined as a determined value corresponding to the product of a determined percentage value and the highest value stored in any of the counters of observations of the records,
- in case none of the metadata-sequences is greater than any of the first- and second-threshold, the one or more controller-circuits are configured to determine the broadcast-station-name as the received metadata;
- the one or more controller-circuits are configured to assign a time-and-date-stamp to the broadcast-station-name when the broadcast-station-name is stored in the second-memory-location;
- the one or more controller-circuits are configured to compare the broadcast-station-name to a database of known broadcast-station-names and further determines the broadcast-station-name based on the database;
- the one or more controller-circuits are further configured to filter the metadata stored in the first-memory-location to remove metadata-sequences characterized as having strings matching predefined regular expressions;
- the one or more controller-circuits are further configured to determine an order of the metadata-sequences based on the count of occurrences of each metadata-sequence, and further determines the broadcast-station-name based on the order of the metadata-sequences;

The present invention also proposes a method of operating a receiver for an infotainment system, said method comprising the steps of:

a) receiving broadcast-signals from transmitters, with one or more tuners, the broadcast-signals including metadata that includes the broadcast-station-name;

b) storing the metadata in a first-memory-location, with one or more controller-circuits in communication with the one or more tuners;

c) detecting metadata-sequences based on the metadata stored in the first-memory-location with the one or more controller-circuits;

d) counting occurrences of each metadata-sequence with the one or more controller-circuits;

e) determining whether the count of occurrences of each metadata-sequence is greater than a first-threshold with the one or more controller-circuits;

in accordance with the determination of each metadata-sequence for which the count of occurrences is greater than the first-threshold;

f) determining the broadcast-station-name with the one or more controller-circuits; and g) storing the broadcast-station-name in a second-memory-location with the one or more controller-circuits.

Step a) may include the steps of:

a1) tuning the one or more tuners to a single-broadcast-frequency.

a2) scanning available broadcast-frequencies with the one or more tuners.

Step b) may include the steps of:

b1) storing metadata as records including at least the following: a string, a counter of observations of the record, a timestamp of last observation, an average period of time between two strings being observed, one or more links to other records observed after current record including at least a counter of observations of the link ($C_L$) and a timestamp of the last observation ($T_L$)

and step c) may include the step of:

c1) detecting metadata-sequences based on the stored records and using the one or more links between records.

Step f) may include the step of:

f1) reducing the metadata-sequences by keeping for further use only sequences for which the count of occurrences is greater than a first-threshold.

Preferably the method further comprises the steps of:

h) determining, with the one or more controller-circuits, whether the count of occurrences of each metadata-sequence is greater than a second-threshold, and in accordance with the determination of each metadata-sequence for which the count of occurrences is greater than the second-threshold;

i) determining the broadcast-station-name; and j) storing the broadcast-station-name in the second-memory-location.

Step g) may include the step of:

g1) assigning a time-and-date-stamp to the broadcast-station-name, with the one or more controller-circuits, when the broadcast-station-name is stored in the second-memory-location.

Preferably the method further comprises the step of:

k) comparing the broadcast-station-name is to a database of known broadcast-station-names, with the one or more controller-circuits, and further determining the broadcast-station-name based on the database.

Step b) may also include the step of:

b2) filtering the metadata stored in the first-memory-location, with the one or more controller-circuits, to remove each metadata-sequence characterized as having strings matching predefined regular expressions.

Preferably the method further comprises the step of:

l) determining an order of the metadata-sequences based on the count of occurrences of each metadata-sequence, with the one or more controller-circuits, and further determining the broadcast-station-name based on the order of the metadata-sequences.

Preferably the method further comprises the step of:

m) detecting two or more metadata-sequences containing a same set of records and merging these two or more metadata-sequences into one metadata-sequence by computing each record of each metadata-sequence with the same set of records in the following way: keeping the string, adding values of the counters of observations of the record, taking the most recent timestamp of last observation, averaging the periods of time between two strings being observed, adding values of the counters of observations of the link and taking the most recent timestamp of last observation.

Preferably the method further comprises the step of:

n) detecting any metadata-sequence containing a loop defined as a metadata-sequence where one record appears at least twice and reducing metadata-sequences containing a loop by cutting all records in the loop after the first appearance of the record repeated twice.

BRIEF DESCRIPTION OF THE DRAWINGS

The present invention is now described by way of example with reference to the accompanying drawings in which.

DESCRIPTION OF THE PREFERRED EMBODIMENTS

Figure 1:
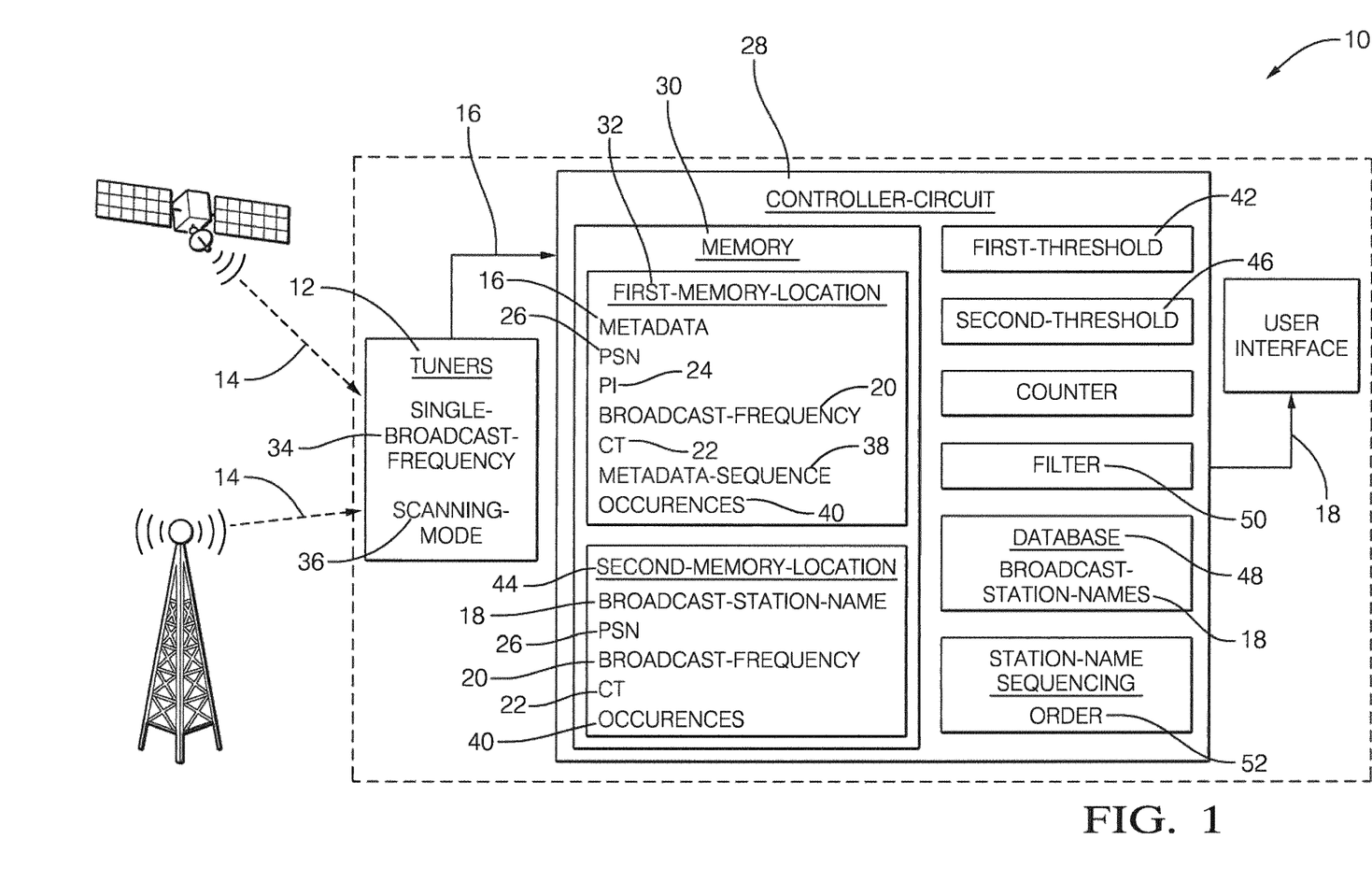
FIG. 1 is a block diagram illustrating a receiver for an infotainment system according to a preferred embodiment of the invention.

Hereinafter, a receiver 10 for an infotainment system according to an embodiment of the present invention will be described with reference to the figures. FIG. 1 is a block diagram illustrating the overall structure of the receiver 10. The receiver 10 includes one or more tuners 12 operable to receive broadcast-signals 14 from transmitters. The transmitters may be any transmitters, transmitting audio and/or video signals over the air. The transmissions may emanate from a ground-based antenna or a satellite-based antenna. The broadcast-signals 14 include metadata 16 that includes, but is not limited to, a broadcast-station-name 18. The metadata 16 may be in compliance with the Radio Data System (RDS) communications protocol standard and may include metadata 16 indicating a broadcast-frequency 20, a clock-time-and-date 22 (CT 22), a program identification 24 (PI 24), and a program service name 26 (PSN 26). While the RDS protocol is primarily used in frequency modulated (FM) transmissions, it will be appreciated that the invention described herein may be used for other transmissions besides FM that include metadata transmitted along with the primary broadcast data.

The receiver 10 also includes one or more controller-circuits 28 in communication with the one or more tuners 12. The one or more controller-circuits 28 may include a processor (not shown) such as a microprocessor or other control circuitry such as analog and/or digital control circuitry including an application specific integrated circuit (ASIC) for processing data as should be evident to those in the art. The one or more controller-circuits 28 include a memory 30, including non-volatile memory, such as electrically erasable programmable read-only memory (EEPROM) for storing one or more routines, thresholds, and captured data. The one or more routines may be executed by the processor to perform steps for determining the broadcast-station-name 18 based on signals received by the one or more controller-circuits 28 from the one or more tuners 12, as described herein.

In one embodiment of the invention, the one or more tuners 12 are tuned to a single-broadcast-frequency 34. The one or more controller-circuits 28 are configured to store the metadata 16 from the broadcast-signals 14 in a first-memory-location 32 within the memory 30, as illustrated in FIG. 1. The one or more controller-circuits 28 detect metadata-sequences 38 based on the metadata 16 stored in the first-memory-location 32. In other words, the one or more controller-circuits 28 determine strings of text that constitute words and/or numbers from the metadata 16. The one or more controller-circuits 28 may use any of the known techniques for determining the metadata-sequences 38, such as a Longest Common Subsequence (LCS) routine. The one or more controller-circuits 28 count occurrences 40 of each metadata-sequence 38 with a counter and determine whether the count of occurrences 40 of each metadata-sequence 38 is greater than a first-threshold 42. The first-threshold 42 may be user defined and is preferably determined experimentally. In accordance with the determination of the count of occurrences 40 of each metadata-sequence 38 being greater than the first-threshold 42, the one or more controller-circuits 28 determine the broadcast-station-name 18 and store the broadcast-station-name 18 in a second-memory-location 44 (i.e. a persistent memory) for later reference. In other words, the one or more controller-circuits 28 determine which metadata-sequences 38 have a number of repeated broadcasts greater than the first-threshold 42 over time and use these metadata-sequences 38 to determine the broadcast-station-name 18.

Figure 4:
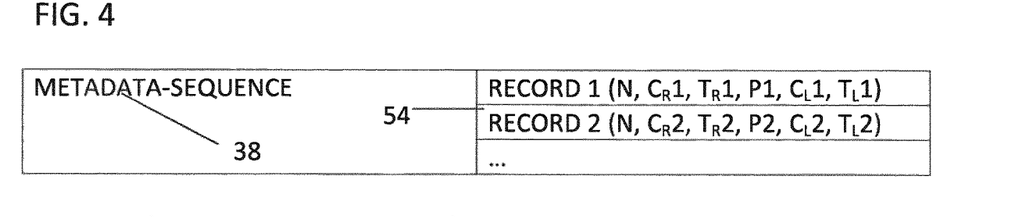
FIG. 4 is a block diagram illustrating a metadata-sequence split into records.

In another embodiment of the invention, which will be described in relation with FIG. 4, each metadata-sequence 38 in accordance with graph theory includes one or more records 54, each record including at least the following metadata: a string N (string of character), a counter of observations of the record $C_R$ (integer), a timestamp of last observation $T_R$ (sec), an average period of time between two strings being observed P (msec), one or more links L to other records observed after current record including at least a counter of observations of the link $C_L$ (integer) and a timestamp of the last observation $T_L$ (sec).

The string N usually corresponds to the name itself or a part of the name the station. N should be stored either in form of broadcast or converted to universal form (e.g. UTF-8). Implementer is responsible for providing encoding independent string comparison algorithm which may be strictly related to broadcast standard. The counter of observations of the record $C_R$ should be stored as an integer value incremented every time a particular string N is observed. If exactly the same string is being broadcast one after another (when tuner is continuously tuned to single station and signal conditions guarantee stable metadata reception), $C_R$ should also be incremented. The timestamp of last observation $T_R$ should be stored as a single timestamp representation. It may depend on operating system or programming language used. The average period of time P between two strings being observed should contain average period updated every time a string change is observed. In case the string was found by background tuner (which does not stay long on particular frequency to scan whole band) or when the signal conditions does not guarantee stable metadata reception, observed period should not be taken into account. The one or more links L should be implemented as a collection of pointers/references (depending of programming language used) allowing easy removal of selected links when record they point to is removed from the database. Every link L to other records observed after current record includes at least a counter of observations of the link $C_L$ and a timestamp of the last observation $T_L$. The counter of observations of the link $C_L$ should be stored as an integer value incremented every time a particular link is observed. In case the link (string/name change) was directly detected by a background tuner (which does not stay long on particular frequency to scan whole band) or when the signal conditions does not guarantee stable metadata reception, $C_L$ should be also incremented. In a preferred mode, for names and links received from foreground tuner, an increment should be done by a foreground constant $C_{LFG}$ from background tuner (scanning) or in weak signal by a background constant $C_{LBG}$. Values of those two constants should be found experimentally, however $C_{LFG}$ shall be greater than or equal to $C_{LBG}$. The timestamp of the last observation $T_L$ should be stored as a single timestamp representation (may depend on operating system or programming language used). The one or more controller-circuits 28 further detect metadata-sequences 38 based on the stored records and using the one or more links between records. All records stored in the database should be persistent, i.e. copied in a non-volatile memory. To avoid big database consuming too much persistent memory and CPU power for processing, old records should be removed. Clearing database may be performed on system shutdown/startup as well as periodically. Records not observed for particular time ($P_{RMAX}$ [sec]=NOW−$T_R$). $P_{RMAX}$ value may depend on system architecture and should be set experimentally. Links L not observed for particular time ($P_{LMAX}$ [sec]=NOW−$T_L$). $P_{LMAX}$ value may depend on system architecture and should be set experimentally.

In yet another embodiment of the invention, the one or more controller-circuits 28 detect two or more metadata-sequences 38 containing a same set of records 54 and merge these two or more metadata-sequences into one metadata-sequence by computing each record of each metadata-sequence with the same set of records in the following configuration: keep the string (N), add values of the counters of observations of the record ($C_R$=$C_R$1+$C_R$2+ . . . ), take the most recent timestamp of last observation ($T_R$=max ($T_R$1; $T_R$2; . . . ), average the periods of time between two strings being observed (P=(P1+P2)/2), add values of the counters of observations of the link ($C_L$=$C_L$1+$C_L$2+ . . . ), take the most recent timestamp of last observation ($T_L$=max ($T_L$1; $T_L$2; . . . ).

In yet another embodiment of the invention, the one or more controller-circuits 28 reduce the metadata-sequences by keeping for further use only sequences 38 for which the count of occurrences 40 is greater than a first-threshold 42. The first-threshold 42 is preferably defined as a determined value $C_{RMIN}$ chosen to ignore the less frequently appearing records $C_R$<$C_{RMIN}$.

In yet another embodiment of the invention, the one or more tuners 12 are in a scanning-mode 36 wherein the one or more tuners 12 are scanning the available broadcast-frequencies 20. It will be appreciated that the receiver 10 may include multiple tuners 12 operating in the scanning-mode 36 while one tuner 12 is tuned to the single-broadcast-frequency 34 desired by the user. The one or more controller-circuits 28 store the metadata 16 from the broadcast-signals 14 in the first-memory-location 32 within the memory 30, as done when the tuner 12 is tuned to a single-broadcast-frequency 34. The one or more controller-circuits 28 detect the metadata-sequences 38 based on the metadata 16 stored in the first-memory-location 32, count the occurrences 40 of each metadata-sequence 38 with a counter, and determine whether the count of occurrences 40 of each metadata-sequence 38 is greater than a second-threshold 46. The second-threshold 46 may be user defined and is preferably set experimentally. Experimentation by the inventors has discovered that having the second-threshold 46 greater than the first-threshold 42 is advantageous, as a larger sample size of metadata 16 improves the accuracy of determining the broadcast-station-name 18 when the tuners 12 are operating in the scanning-mode 36. In accordance with the determination of the count of occurrences 40 of each metadata-sequence 38 being greater than the second-threshold 46, the one or more controller-circuits 28 determine the broadcast-station-name 18 and store the broadcast-station-name 18 in the second-memory-location 44 for later reference.

In yet another embodiment of the invention, the second-threshold (46) is defined as a determined value $C_{RP}*C_{RMAX}$ corresponding to the product of a determined percentage value $C_{RP}$ and the highest value $C_{RMAX}$ stored in any of the counters of observations of the records $C_R$, and the one or more controller-circuits 28 determine whether the count of occurrences 40 of each metadata-sequence 38 is greater than the second-threshold 46 and further reduce the metadata-sequences by keeping for further use only sequences 38 for which the count of occurrences 40 is greater than a second-threshold 46, and, in accordance with metadata-sequences 38 for which the count of occurrences 40 is greater than the second-threshold 46, the one or more controller-circuits 28 determine the broadcast-station-name 18 and storing the broadcast-station-name 18 in the second-memory-location 44.

In yet another embodiment of the invention, the one or more controller-circuits 28 assign a time-and-date-stamp (i.e. the CT 22) to the broadcast-station-name 18 when the broadcast-station-name 18 is stored in the second-memory-location 44. The assignment of the CT 22 to the broadcast-station-name 18 has the technical benefit of determining the last update to the broadcast-station-name 18 when the infotainment system is rebooted after a power-down event. It will be appreciated that other tags, labels, and metadata 16 may be associated with the broadcast-station-name 18 that is stored in the memory 30 for later use by the receiver 10, including whether the metadata-sequences 38 are received by the tuners 12 operating in the scanning-mode 36.

In yet another embodiment of the invention, the one or more controller-circuits 28 compare the broadcast-station-name 18 to a database 48 of known broadcast-station-names 18 and further determine the broadcast-station-name 18 based on the database 48. The database 48 may reside either in the receiver 10 as illustrated in FIG. 1, or in a cloud-storage accessible to the one or more controller-circuits 28 by wireless communication.

In yet another embodiment of the invention, the one or more controller-circuits 28 further filter 50 the metadata 16 stored in the first-memory-location 32 to remove metadata-sequences 38 characterized as having strings matching predefined regular expressions (e.g. phone numbers, addresses, etc.) that would not be typically associated with the broadcast-station-name 18. Any of the known methods matching the regular expressions may be used, such as Thompson's construction algorithm, or other libraries providing regular expressions matching.

In yet another embodiment of the invention, the one or more controller-circuits 28 further determine an order 52 of the metadata-sequences 38 based on the count of occurrences 40 of each metadata-sequence 38, and further determines the broadcast-station-name 18 based on the order 52 of the metadata-sequences 38. In other words, the one or more controller-circuits 28 rank-order the metadata-sequences 38 from the highest count of occurrences 40 to the lowest count of occurrences 40 and use the rank-order to determine the broadcast-station-name 18.

In yet another embodiment of the invention, the one or more controller-circuits 28 detect any metadata-sequence 38 containing a loop defined as a metadata-sequence where one record 54 appears at least twice and to reduce metadata-sequences containing a loop by cutting all records in the loop after the first appearance of the record repeated twice.

In yet another embodiment of the invention, in case none of the metadata-sequences is greater than any of the first- and second-threshold 42, 46, the one or more controller-circuits 28 determine the broadcast-station-name 18 as the received metadata 16.

Figure 2:
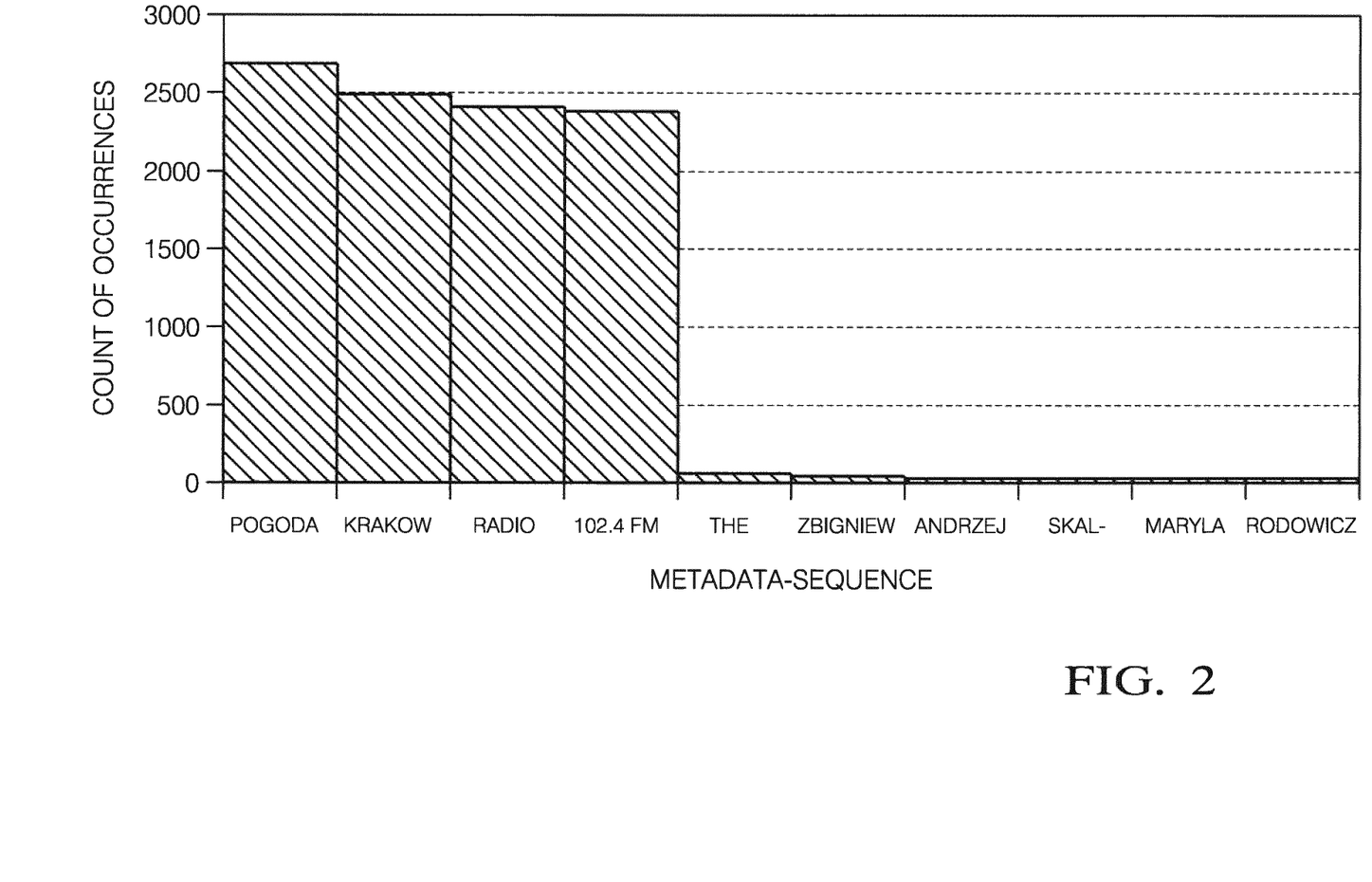
FIG. 2 is a plot illustrating an example a detected broadcast-station-name.

FIG. 2 is a plot of the metadata-sequences 38 and their respective counts of occurrences 40, and illustrates an example for which the receiver 10 determines the broadcast-station-name 18 as "Pogoda Krakow Radio". It will be appreciated that applying the LCS sequencing algorithm mentioned above would change the broadcast-station-name 18 to "Radio Pogoda Krakow".

Figure 3:
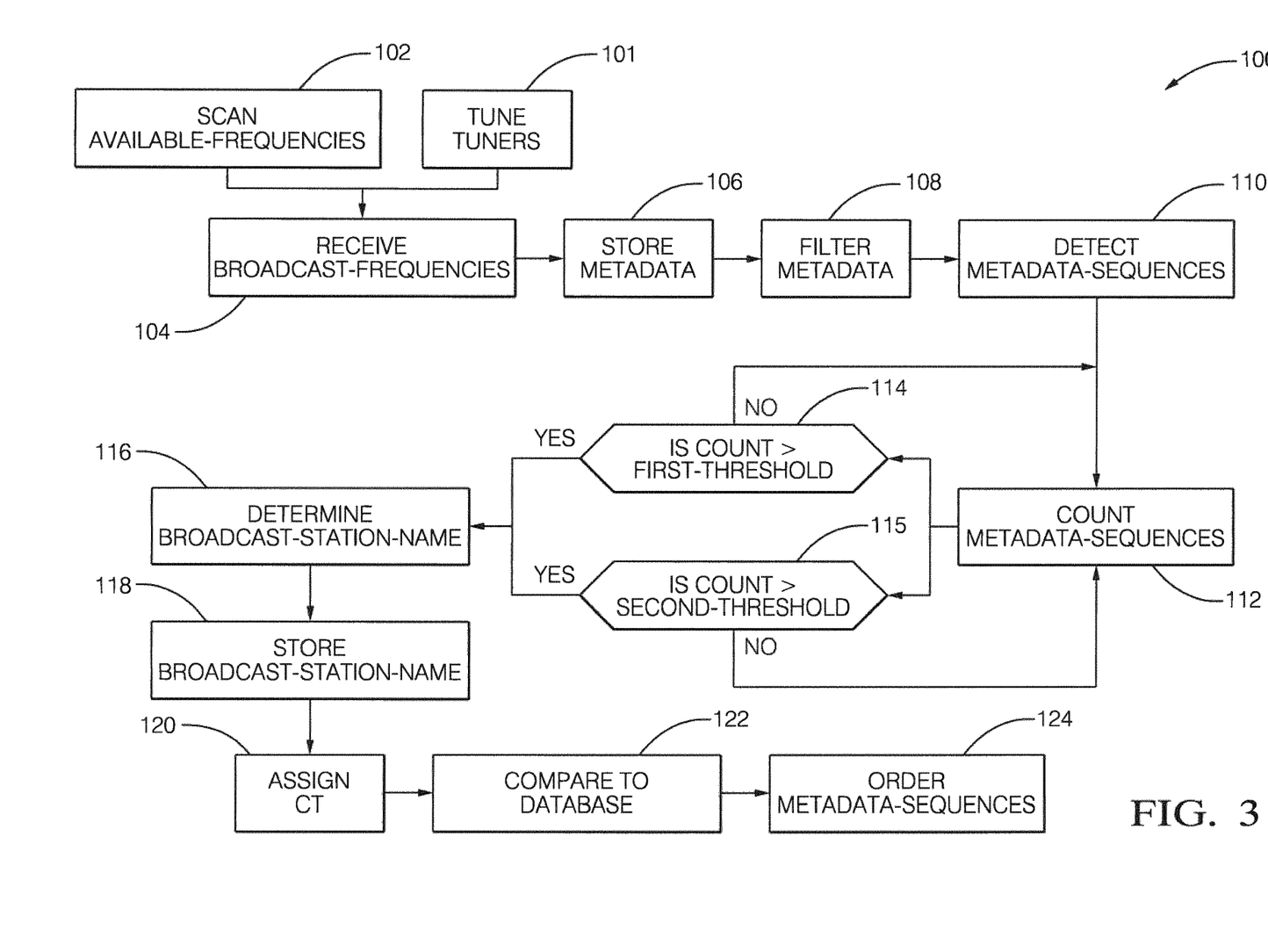
FIG. 3 is a block diagram illustrating an example a method of operating a receiver for an infotainment system.

FIG. 3 is a flow diagram illustrating a method 100 of operating the receiver 10 illustrated in FIG. 1. Said method 100 comprises the steps of:

a) receiving broadcast-signals 14 from transmitters, with one or more tuners 12, the broadcast-signals 14 including metadata 16 that includes the broadcast-station-name 18;

b) storing the metadata 16 in a first-memory-location 32, with one or more controller-circuits 28 in communication with the one or more tuners 12;

c) detecting metadata-sequences 38 based on the metadata 16 stored in the first-memory-location 32 with the one or more controller-circuits 28;

d) counting occurrences 40 of each metadata-sequence 38 with the one or more controller-circuits 28;

e) determining whether the count of occurrences 40 of each metadata-sequence 38 is greater than a first-threshold 42 with the one or more controller-circuits 28;

in accordance with the determination that the count of occurrences 40 of each metadata-sequences 38 is greater than the first-threshold 42;

f) determining the broadcast-station-name 18 with the one or more controller-circuits 28; and g) storing the broadcast-station-name 18 in a second-memory-location 44 with the one or more controller-circuits 28.

Step a) preferably includes the steps of:
 a1) tuning the one or more tuners 12 to a single-broadcast-frequency 34; and
 a2) scanning available broadcast-frequencies 20 with the one or more tuners 12.

The method 100 preferably includes the steps of:
 h) determining, with the one or more controller-circuits 28, whether the count of occurrences 40 of each metadata-sequence 38 is greater than a second-threshold 46, and in accordance with the determination that the count of occurrences 40 of each metadata-sequence 38 is greater than the second-threshold 46;
 i) determining the broadcast-station-name 18; and
 j) storing the broadcast-station-name 18 in the second-memory-location 44.

Step g) preferably includes the step of:
 g1) assigning a clock-time-and-date-stamp 22 (CT 22) to the broadcast-station-name 18, with the one or more controller-circuits 28, when the broadcast-station-name 18 is stored in the second-memory-location 44.

The method 100 preferably includes the step of:
 k) comparing the broadcast-station-name 18 is to a database 48 of known broadcast-station-names 18, with the one or more controller-circuits 28, and further determines the broadcast-station-name 18 based on the database 48.

Step b) preferably includes the step of:
 b1) storing metadata as records including at least the following: a string, a counter of observations of the record, a timestamp of last observation, an average period of time between two strings being observed, one or more links to other records observed after current record including at least a counter of observations of the link $C_L$ and a timestamp of the last observation $T_L$ and step c) preferably includes the step of:
 c1) detecting metadata-sequences based on the stored records and using the one or more links between records.

Step b) may also include the steps of:
 b2) filtering the metadata 16 stored in the first-memory-location 32, with the one or more controller-circuits 28, to remove each metadata-sequence 38 characterized as having strings matching predefined regular expressions.

The method 100 preferably includes the step of:
 l) determining an order 52 of the metadata-sequences 38 based on the count of occurrences 40 of each metadata-sequence 38, with the one or more controller-circuits 28, and further determines the broadcast-station-name 18 based on the order 52 of the metadata-sequences 38.

Preferably the method 100 further comprises the step of:
 m) detecting two or more metadata-sequences containing a same set of records and merging these two or more metadata-sequences into one metadata-sequence by computing each record of each metadata-sequence with the same set of records in the following way: keeping the string, adding values of the counters of observations of the record, taking the most recent timestamp of last observation, averaging the periods of time between two strings being observed, adding values of the counters of observations of the link and taking the most recent timestamp of last observation.

Preferably the method 100 further comprises the step of:
 n) detecting any metadata-sequence containing a loop defined as a metadata-sequence where one record appears at least twice and reducing metadata-sequences containing a loop by cutting all records in the loop after the first appearance of the record repeated twice.

Step f) preferably includes the step of:
 f1) reducing the metadata-sequences by keeping for further use only sequences for which the count of occurrences is greater than a first-threshold.

FIGS. 5A-5B and FIGS. 6A-6B are examples of metadata-sequences before and after reduction. Records may be represented by graph nodes. Their links L become then arcs of directed weighted graph where $C_L$ of particular link is arc's weight. 4.1. Record database contains all records seen in last $P_{RMAX}$ including those which were not observed enough number of times to be used in metadata-sequences to ignore less frequently appearing names. $C_{RMIN}$ should then be defined as the first-threshold value chosen to ignore the less frequently appearing records for metadata-sequence detection. The second-threshold 46 for metadata-sequence detection is defined as a determined value $C_{RP}*C_{RMAX}$ corresponding to the product of a determined percentage value $C_{RP}$ and the highest value $C_{RMAX}$ stored in any of the counters of observations of the records $C_R$.

Figure 5A:
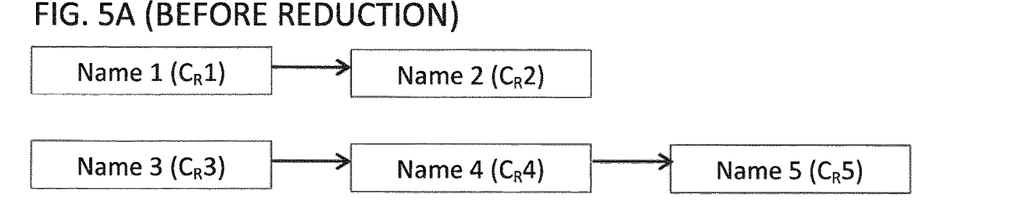
FIGS. 5A-5B are examples of metadata-sequences before and after reduction.
Figure 5B:
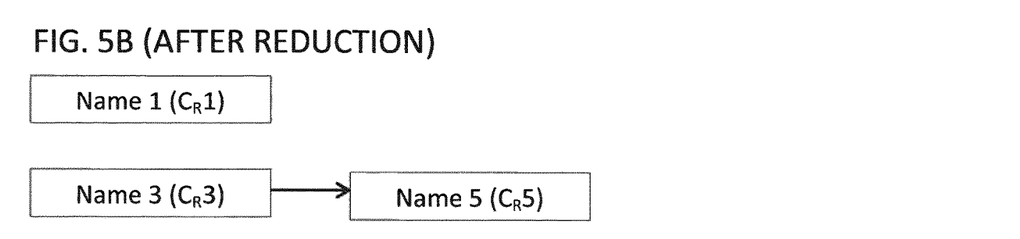

In FIG. 5A, the example contains two detected sequences before reduction, namely Name1/Name2 and Name3/Name4/Name5. The counter values $C_R2$ and $C_R4$ are lower than $C_{RMIN}$ and should not be used for the sequence detection and name determination. In FIG. 5B, after reduction, i.e. non consideration of records Name2 and Name4. In the newly detected sequence Name3/Name5, $C_L$ value for the arc created from reduced two or more arcs should be an average of those arcs' $C_L$ values.

Figure 6A:
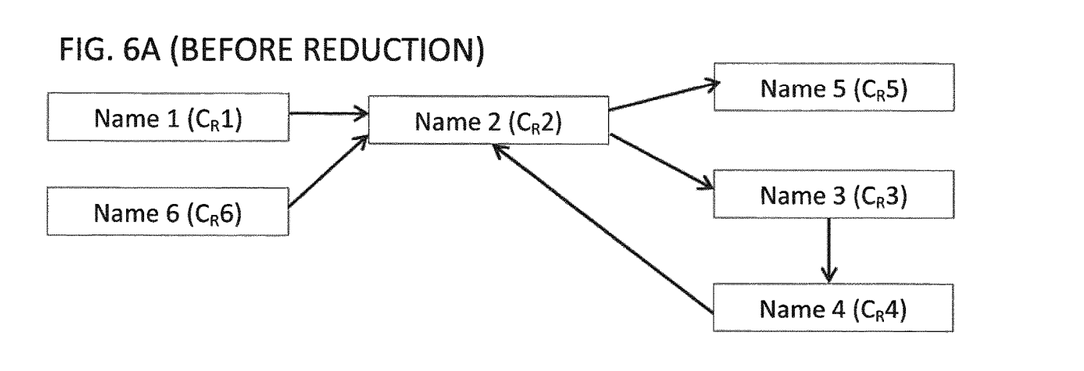
FIGS. 6A-6B are examples of metadata-sequences before and after reduction.

If graph reduction leads to a loop on the same node of the graph than all sequences leading into this node end. However new sequences may still start from this node. In FIG. 6A, before reduction, there are the following sequences:
 Name1→Name2→Name3→Name4→cycle to Name2
 Name 7→Name2→Name3→Name4→cycle to Name2
 Name1→Name2→Name5
 Name7→Name2→Name5.

After reduction by cutting all records in the loop after the first appearance of the record repeated twice, the reduced sequences are as follows:
 Name1→Name2→~~Name3~~ ~~Name4~~ ~~cycle to Name2~~
 Name 7→Name2→~~Name3~~ ~~Name4~~ ~~cycle to Name2~~
 Name1→Name2→~~Name5~~
 Name7→Name2→~~Name5~~ .

Figure 6B:
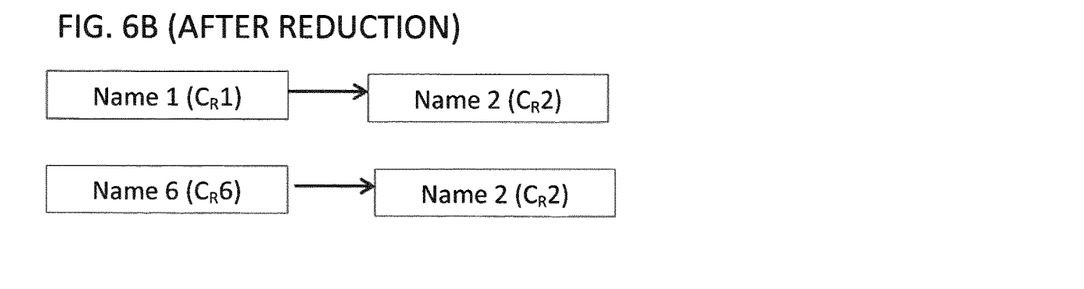

Which is then obviously reduced as shown in FIG. 6B, namely:
 Name1→Name2
 Name7→Name2.

When after reduction two sequences contain the same set of records in the same order, these sequences should be merged into one and records metadata should be recalculated in the following way:

$$C_R = C_R1 + C_R2$$

$$T_R = \max(T_R1; T_R2)$$

$$P = (P1 + P2)/2$$

$$C_L = C_L1 + C_L2$$

$$T_L = \max(T_L1; T_L2).$$

The invention claimed is:
1. A receiver comprising:
 at least one tuner that is operable to receive broadcast-signals from transmitters, the broadcast-signals including metadata that includes a broadcast-station-name; and at least one controller-circuit in communication with the at least one tuner, the controller-circuit being configured to:

store the metadata in a first-memory-location;

detect metadata-sequences based on the metadata stored in the first-memory-location;

count occurrences of each metadata-sequence;

determine whether the counted occurrences of each metadata-sequence is greater than a first-threshold;

based on the counted occurrences of each metadata-sequence being greater than the first-threshold, determine the broadcast-station-name; and store the determined broadcast-station-name in a second-memory-location, wherein each metadata-sequence, in accordance with graph theory, includes one or more records;

each record is represented by a graph node;

each record includes at least:

a string that corresponds to a part of a name of a broadcast station;

a counter of observations of the record;

a timestamp of last observation;

an average period of time between two strings being observed;

one or more links to other records, corresponding to one or more graph arcs, observed after a current record including at least a counter of observations of the link and a timestamp of the last observation; and the controller-circuit is configured to detect metadata-sequences based on the stored records and the one or more links between records.

2. The receiver in accordance with claim 1, wherein the controller-circuit is configured to detect two or more metadata-sequences containing a same set of strings and to merge the two or more metadata-sequences into one metadata-sequence by computing each record of each metadata-sequence with the same set of strings in a configuration by keeping the string;

adding values of the counters of observations of the record;

taking the most recent timestamp of last observation;

averaging the periods of time between two strings being observed;

adding values of the counters of observations of the link; and taking the most recent timestamp of last observation.

3. The receiver in accordance with claim 1, wherein the controller-circuit is configured to detect any metadata-sequence containing a loop defined as a metadata-sequence where one record appears at least twice and to reduce metadata-sequences containing a loop by cutting records in the loop after a first appearance of the record repeated twice.

4. The receiver in accordance with claim 1, wherein the first-threshold is defined as a determined value chosen to ignore less frequently appearing records, and the controller-circuit is configured to determine the broadcast-station-name by reducing the metadata-sequences by only storing metadata-sequences for which the counted occurrences is greater than a first-threshold.

5. The receiver in accordance with claim 4, wherein a second-threshold is defined as a determined value corresponding to a product of a determined percentage value and a highest value stored in any of the counters of observations of the records, the second-threshold is higher than the first-threshold, and the controller-circuit is configured to determine whether the counted occurrences of each metadata-sequence is greater than the second-threshold and further reduce the metadata-sequences by only storing metadata-sequences for which the counted occurrences is greater than a second-threshold, and the controller-circuit is configured to determine the broadcast-station-name and store the broadcast-station-name in the second-memory-location in accordance with metadata-sequences for which the counted occurrences is greater than the second-threshold.

6. The receiver in accordance with claim 5, wherein, in case none of the metadata-sequences is greater than the first-threshold or the second-threshold, the controller-circuit is configured to determine the broadcast-station-name as the received metadata.

7. The receiver in accordance with claim 1, wherein the controller-circuit is configured to determine an order of the metadata-sequences based on the counted occurrences of each metadata-sequence, and to determine the broadcast-station-name based on the order of the metadata-sequences.

8. A method of operating a receiver, the method comprising:

receiving broadcast-signals from transmitters, using at least one tuner, the broadcast-signals including metadata that includes a broadcast-station-name; and using at least one controller-circuit in communication with the at least one tuner for storing the metadata in a first-memory-location;

detecting metadata-sequences based on the metadata stored in the first-memory-location;

counting occurrences of each metadata-sequence;

determining whether the counted occurrences of each metadata-sequence is greater than a first-threshold;

in accordance with the determination of the counted occurrences of each metadata-sequences being greater than the first-threshold, determining the broadcast-station-name; and storing the determined broadcast-station-name in a second-memory-location with the controller-circuit, wherein storing the metadata in the first-memory-location includes storing metadata as records represented by graph nodes;

the records include at least:

a string that corresponds to a part of a name of a broadcast station;

a counter of observations of the record;

a timestamp of a last observation;

an average period of time between two strings being observed;

one or more links to other records, corresponding to one or more graph arcs, observed after a current record including at least a counter of observations of the link and the timestamp of the last observation; and detecting the metadata-sequences based on the metadata stored in the first-memory-location includes detecting metadata-sequences based on the stored records and using the one or more links between records.

9. The method in accordance with claim 8, comprising detecting two or more metadata-sequences containing a same set of strings and merging the two or more metadata-sequences into one metadata-sequence by computing each record of each metadata-sequence with the same set of strings by:

keeping the string;

adding values of the counters of observations of the record;

taking the most recent timestamp of last observation;

averaging the periods of time between two strings being observed;

adding values of the counters of observations of the link; and taking the most recent timestamp of last observation.

10. The method in accordance with claim 8, comprising detecting any metadata-sequence containing a loop defined as a metadata-sequence where one record appears at least twice and reducing metadata-sequences containing a loop by cutting all records in the loop after a first appearance of the record repeated twice.

11. The method in accordance with claim 8, wherein the first-threshold is defined as a determined value chosen to ignore less frequently appearing records, and determining the broadcast-station-name by reducing the metadata-sequences by only storing metadata-sequences for which the counted occurrences is greater than a first-threshold.

12. The method in accordance with claim 11, comprising defining a second-threshold as a determined value corresponding to a product of a determined percentage value and a highest value stored in any of the counters of observations of the records, the second-threshold being higher than the first-threshold;

determining, with the controller-circuit, whether the counted occurrences of each metadata-sequence is greater than the second-threshold;

further reducing the metadata-sequences by only storing metadata-sequences for which the counted occurrences is greater than the second-threshold; and in accordance with the counted occurrences of each metadata-sequence being greater than the second-threshold, determining the broadcast-station-name and storing the determined broadcast-station-name in the second-memory-location.

13. The method in accordance with claim 8, comprising determining an order of the metadata-sequences based on the counted occurrences of each metadata-sequence, with the controller-circuit, and determining the broadcast-station-name based on the order of the metadata-sequences.

* * * * *